Feb. 4, 1936. O. B. JOHNSON 2,029,872
FIELD TILLER
Filed Dec. 11, 1934
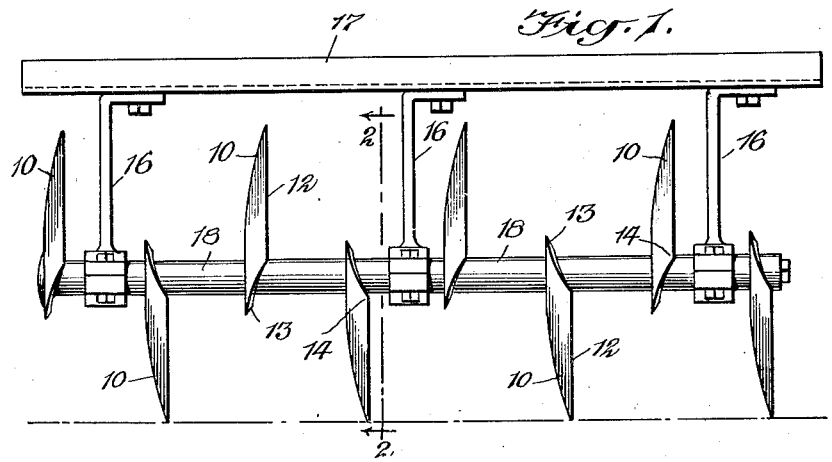
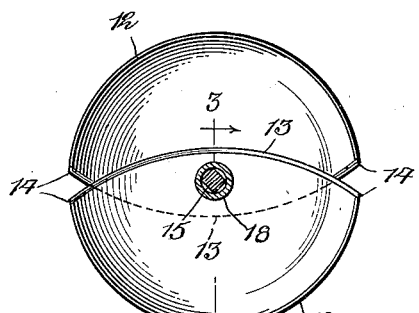
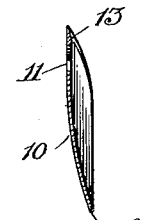
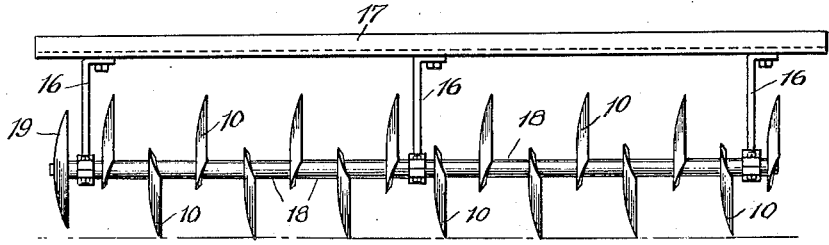
INVENTOR
Oscar B. Johnson
BY
Munn, Anderson & Liddy
ATTORNEYS Patented Feb. 4, 1936

2,029,872

UNITED STATES PATENT OFFICE 2,029,872

FIELD TILLER

Oscar Benjamin Johnson, Ensign, Kans.

Application December 11, 1934, Serial No. 757,046

2 Claims. (Cl. 55—30)

This invention relates to harrow tillers of the rotary type used in gangs.

The principal object of the invention is the provision of a novel type of field tiller which may be used in any type of harrow, either plain, tandem, or one way, which makes pits or holes in the ground at regular intervals, regardless of the direction traveled, to the end that erosion by wind or water is prevented; that in case of a heavy rainfall the pits hold the water where it falls until the ground has time to absorb it; that in case of a dry wind it provides a place for the loose soil to lodge, thereby preventing soil blowing; and that the cutting edges of the tilling elements will penetrate below the usual depth of cultivation and bring up hard, cloddy soil on top, thereby improving the texture of the soil.

The nature of the invention and its distinguishing features and advantages will appear when the following specification is read in connection with the accompanying drawing in which—

Fig. 1 is a front view of a gang of tiller elements constructed and arranged in accordance with the invention;

Fig. 2 is a section taken on the line 2—2 of Fig. 1 and looking in the direction indicated by the arrows;

Fig. 3 is a section of one of the tiller elements, the section being taken through the minor axis thereof as indicated by the line 3—3 in Fig. 2;

Fig. 4 is a front view of a one-way gang of tiller elements.

Referring now more particularly to the drawing, and especially Figs. 2 and 3, it will be apparent that each tiller element of the present invention consists of an approximate semi-circular dished metal body 10 having a square shaft hole 11 therein to provide an axis of rotation for the body 10. The body 10 has two peripheral cutting edges 12 and 13 respectively, which meet in points 14. The cutting edge 12 is curved concentric to the axis of rotation of the body 10, and the cutting edge 13 is curved eccentric to said axis. The points 14 are disposed at opposite ends of the minor axis of the body 10, such minor axis being indicated by the line 3—3.

In accordance with the invention a suitable number of tiller elements having the mentioned features is arranged on a shaft 15 supported for rotation by bearings 16 depending from a frame 17 constituting a gang which may be used either plain or tandem. The tilling elements are maintained in spaced relation on the shaft 15 by tubular spacers 18 arranged on the shaft 15 between the tilling elements. It will be apparent that the tilling elements are arranged eccentrically on the shaft 15, and in accordance with the invention the eccentricity of alternate elements is reversed as shown most clearly in Fig. 1. In other words, the concentric cutting edges 12 are disposed in opposite directions alternately. One-half of the tilling element will be tilling while the other half is inactive. Each half of the elements as mounted on the shaft 15 will start tilling almost immediately after the other half has stopped tilling, in each revolution of the shaft 15. With this arrangement the tilling elements make pits or holes in the ground at regular intervals in order to attain the advantages hereinbefore set forth. The tilling of the ground is accomplished regardless of the direction traveled in relation to a hill, thereby making it unnecessary to terrace the land.

As shown in Fig. 4, when it is desired to use the tilling elements in a gang one way, a land side disk 19 is employed which has a somewhat smaller radius than the element 10 to produce a continuous furrow for the furrow wheels of a harrow to run in. It is to be understood that the effect of the pits or holes left by the tilling elements may be intensified by the use of larger elements or by increasing the spacing thereof. Any suitable size of tilling elements and spacing thereof may be resorted to.

I claim:

1. A tilling implement comprising a shaft providing an axis of rotation, tilling elements mounted on the shaft for rotation, each of said elements being approximately one-half of a disk, said elements being arranged axially in spaced relation to each other, and said elements being oppositely disposed about said axis, alternately.

2. A rotatable tilling element consisting of an approximate semi-circular dished body whose peripheral edges meet in two points, and one of said edges being concentric to the axis of rotation of the element.

OSCAR BENJAMIN JOHNSON.